United States Patent [19]

Rouse

[11] 4,164,802
[45] Aug. 21, 1979

[54] DETERGENT HOLDER ON WINDSHIELD WIPER ARM

[75] Inventor: Donald E. Rouse, Gladstone, Oreg.

[73] Assignee: Wiper-Mate, Inc., Milwaukie, Oreg.

[21] Appl. No.: 940,788

[22] Filed: Sep. 8, 1978

[51] Int. Cl.² .............................................. B60S 1/02
[52] U.S. Cl. .................................................. 15/250.03
[58] Field of Search .................... 15/250.01–250.04, 15/250, 220 R, 103

[56] References Cited

U.S. PATENT DOCUMENTS

| | | | |
|---|---|---|---|
| 2,535,805 | 12/1950 | McIntyre et al. | 15/250.03 |
| 3,792,506 | 2/1974 | Rouse | 15/250.03 |
| 3,803,664 | 4/1974 | Triplett | 15/250.03 |
| 3,859,689 | 1/1975 | Rouse | 15/250.03 |

*Primary Examiner*—Peter Feldman
*Attorney, Agent, or Firm*—Lee R. Schermerhorn

[57] ABSTRACT

A replaceable cartridge is detachably mounted on a rod which is detachably connected with a windshield wiper arm on a vehicle so as to place the cartridge alongside the wiper blade. The cartridge contains a detergent stick and is arranged to admit rain water when the vehicle is in motion with the wiper operating but shield the detergent stick from falling rain when the vehicle is standing still with the wiper at rest. A wick provides a slow release of dissolved detergent on the area of the windshield traversed by the oscillating wiper blade.

9 Claims, 6 Drawing Figures

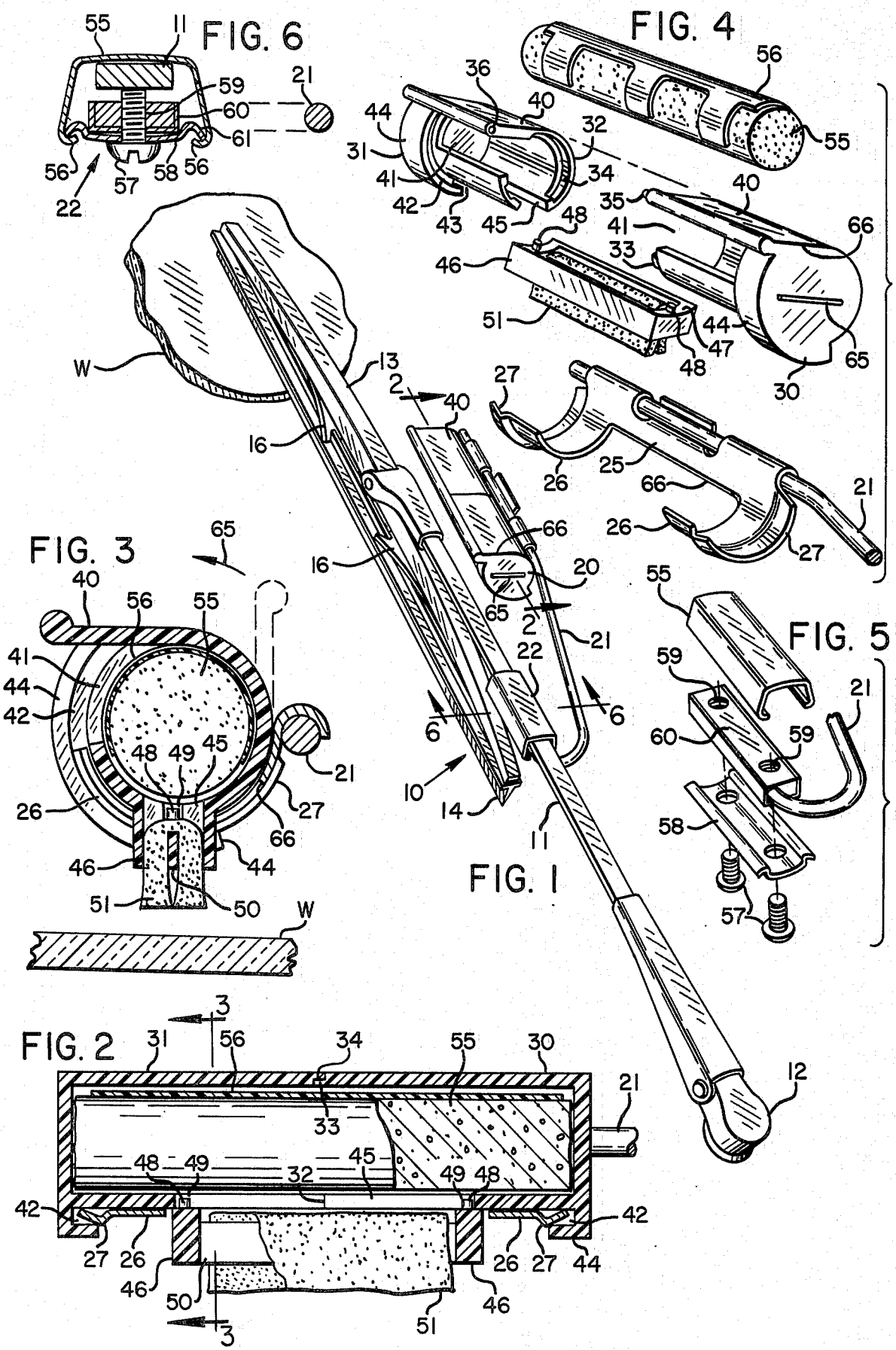

DETERGENT HOLDER ON WINDSHIELD WIPER ARM

BACKGROUND OF THE INVENTION

This invention relates to a detergent holder on a windshield wiper arm and involves certain improvements over the device disclosed in my prior U.S. Pat. No. 3,859,689.

In said patent a detergent stick is contained in a receptacle mounted on a windshield wiper arm. While driving in rainy weather, air currents across the windshield carry a small amount of rain water into the receptacle. This water, containing dissolved detergent, is allowed to escape slowly through a wick onto an area of the windshield traversed by the oscillating woper blade to keep the windshield clean.

The detergent stick must be replaced from to time to time by the user. This involves taking the receptacle apart, inserting a new detergent stick, and then reassembling the receptacle and replacing it in association with the windshield wiper. Although these manipulations do not require much skill they do tend to discourage acceptance of the device by persons who are not mechanically inclined. Another objection to the device in my prior patent is that the detergent stick is exposed to falling rain in the rest position of the wiper when the vehicle is not in use, thereby wasting the detergent.

Objects of the present inventions are, therefore, to provide an improved detergent holder on a windshield wiper arm, to provide a detergent holder which is relatively simple and inexpensive to manufacture, to provide a detergent holder which is easy for the user to install, to provide a replacable cartridge for a detergent stick which does not have to be taken apart and reassembled in order to replace the detergent stick, and to provide a device of the type described which shields the detergent from being wasted by falling rain while the vehicle is not in use.

SUMMARY OF THE INVENTION

In the present construction the detergent stick is contained in a cartridge which does not have to be taken apart by the user. The cartridge is detachably mounted on a pair of arcuate cartridge track arms on a rod which is detachably connected with the windshield wiper arm. When the detergent stick has been consumed, the cartridge is removed and discarded and a new cartridge is installed on the cartridge tracks along side the wiper blade.

The cartridge is arranged to admit rain water when the vehicle is in motion with the wiper operating but the cartridge shields the detergent stick from falling rain when the vehicle is standing still while the wiper is not in operation. A discharge opening in the cartridge permits release of dissolved detergent on the area of the windshield traversed by the oscillating wiper blade. This arrangement prevents waste of the detergent when it is not needed.

The invention will be better understood and additional objects and advantages will become apparent from the following detailed description of the preferred embodiment illustrated on the accompanying drawing. Various changes may be made in the details of construction and arrangement of parts and certain features may be used without others. All such modifications within the scope of the appended claims are included in the invention.

BRIEF DESCRIPTION OF THE DRAWING

FIG. 1 is a perspective view of a windshield wiper and a detergent holder embodying the invention.

FIG. 2 is a view from the line 2—2 in FIG. 1.

FIG. 3 is a view on the line 3—3 in FIG. 2.

FIG. 4 is an exploded perspective view of the cartridge.

FIG. 5 is an exploded perspective view of the detachable connection between the windshield wiper arm and the rod which carries the detergent holder.

FIG. 6 is a view on the line 6—6 in FIG. 1.

DESCRIPTION OF THE PREFERRED EMBODIMENT

FIG. 1 shows a conventional windshield wiper 10 having an arm 11 which is oscillated back and forth by a hub 12 mounted on the end of an oscillating drive shaft. Arm 11 is connected to a holder 13 for a flexible rubber wiper blade 14. Blade 14 is conformed to the curvature of windshield W by a pair of leaf springs 16.

A detergent stick is contained in a replaceable cartridge 20 supported alongside the wiper blade 14. Cartridge 20 is detachably mounted on the free end of a rod 21, the other end of which is detachably connected to wiper arm 11 by a clamp 22. Rod 21 is readily bendable to position the elongated cartridge 20 close to and parallel with wiper blade 14 for use on windshield wipers where the wiper blade 14 is not parallel with arm 11. In the illustrated embodiment wiper blade 14 is substantially parallel with arm 11.

Referring now to FIG. 4, a bracket 25 is soldered or brazed on the free end of rod 21. Bracket 25 comprises a pair of arcuate cartridge track arms 26 for detachably receiving the cartridge 20. Each track arm 26 has an offset lip 27 extending along one edge thereof. Rod 21 and bracket 25 are preferably made of metal.

For convenience in molding the cartridge 20 out of suitable plastic material the housing portion of the cartridge is made in two end parts, 30 and 31 which are adhesively connected together in a circumferential joint at 32. To facilitate assembly and insure proper registration of the two parts the end part 30 has a flange 33 to fit a groove 34 in end part 31, and a dowel 35 to fit in hole 36 in part 31.

These housing parts are generally cylindrical except for a hood portion 40 which overhangs a longitudinal inlet opening 41. An arcuate groove 42 in each end part has an entrance end 43 to receive the end of offset lip portion 27 on a cartridge track arm 26 in rotary movement as shown in FIG. 2. Grooves 42 are defined by axial arcuate flanges 44. Track arms 26 and grooves 42 are of substantially semicircular extent.

The rear side of the cartridge housing facing the windshield contains a longitudinal outlet opening 45 which is covered by a wick holder 46. Wick holder 46 is molded of plastic material and has a surface 47 of cylindrical curvature to fit the outside surface of housing parts 30 and 31. A pair of pins 48 project from end portions of the cylindrical surface 47 and are received in longitudinal slots 49 in prolongation of outlet opening 45 to position the wick holder on the housing parts 30 and 31. In assembly, the wick holder is adhesively secured to these housing parts.

As best seen in FIGS. 2 and 3 the wick holder 46 has an open center in register with outlet opening 45 bisected by a longitudinal bar 50. A flat strip of porous wick material 51 is folded over the bar 50 and retained by frictional engagement with the side walls of the wick holder.

Before assembling the parts 30, 31 and 46 in the manner described, a water soluble detergent stick 55 is inserted in the cylindrical housing of the cartridge. The structural integrity of the detergent stick during prolonged exposure to water is maintained by a plastic cage 56.

The details of connector clamp 2 are shown in FIGS. 5 and 6. A metal channel member 55 having inturned lips 56 on its side flanges is placed over wiper arm 11. A pair of set screws 57 extend through smooth holes in a plate 58 and screw threaded holes 59 in a metal block 60 which is an intregal part of rod 21. The side edges 61 of plate 58 engage under the inturned lips 56 on the side flanges of channel 55. Thus, the parts are slidable lengthwise for assembly on wiper arm 11 and may be clamped in adjusted position on the wiper arm by tightening set screws 57.

This arrangement of the connector clamp 22 makes it reversible for mounting on either the front or rear sides of wiper arm 11 to accommodate different types of wiper arms presently in use.

When detergent stick 55 has dissolved away, the entire cartridge 20 is removed and discarded. Removal is accomplished by merely rotating the cartridge a quarter turn clockwise to its broken line position in FIG. 3 thereby disengaging arcuate track arms 26 from arcuate grooves 42 allowing the cartridge to be lifted off the track arms.

In reverse operation, a new cartridge is installed by placing it in the cradle of track arms 26 in the broken line position in FIG. 3. This places the ends of track arms 26 at the entrance ends 43 of grooves 42 whereby a quarter turn of the cartridge in a counterclockwise direction as indicated by arrow 65 causes the ends of track arms 26 to enter the grooves 42 and secure the cartridge in operative position. An edge surface 66 on bracket 25 engages wick holder 46 to stop the counterclockwise rotation of the cartridge at a limit position. This manipulation is so simple that it does not discourage use of the device by persons without mechanical skills.

When the wiper is operating with the vehicle in forward motion in rainy weather, or during operation of conventional windshield washer nozzles, air currents across the windshield carry a small amount of water into inlet opening 41 to reach the detergent stick 55. This water, containing dissolved detergent, escapes through outlet opening 45 and wick holder 46.

Since the wick 51 completely fills the opening in the wick holder the escaping water can only seep slowly through the wick to avoid waste of the detergent. Wick 51 does not wipe the windshield but is maintained in spaced relation as shown in FIG. 3 whereby the discharged water containing dissolved detergent escapes drop by drop onto a central portion of the windshield area traversed by wiper blade 14. In the present construction, however, wick 51 is not essential and may be omitted.

Hood 40 is flat and projects approximately parallel with the windshield. When the vehicle is parked in falling rain and the wiper is not operating, the inlet opening 41 is shielded against the entrance of water which would waste the detergent.

Provision is made to adapt the device in a very simple manner to windshields of different shapes and drive shafts for wiper arm hub 12 disposed at different angles from horizontal. For this purpose a guide line 65 is molded onto the face of end part 30 with the line extending parallel to the edge 66 of hood 40. Cartridge 20 is rotated on track arms 26 to place guide line 65 in horizontal position when the wiper is in rest position. This properly orients the cartridge on all present automobiles having wipers mounted below the windshield.

What is claimed is:

1. A detergent holder for a windshield wiper comprising a rod, means for mounting one end of said rod on an oscillating arm which carries said wiper, with the other end of said rod extending alongside said wiper, a pair of arcuate cartridge track arms having free ends extending laterally from said other end of said rod, and a replaceable cartridge having rotatable engagement with said track arms, said cartridge comprising a generally cylindrical housing alongside said wiper and having a longitudinal outlet opening in its rear side which faces the windshield, said cartridge including arcuate means on the opposite ends of said housing for receiving said free ends of said cartridge track arms, a detergent stick in said housing, an inlet opening in one side of said housing for the entrance of water into said housing when a vehicle carrying said wiper and detergent holder is in forward motion with the wiper in operation, and a hood on said housing extending over said inlet opening when the wiper is in rest position to shield said inlet opening from falling rain when the wiper is not operating.

2. A detergent holder as defined in claim 1, said cartridge being rotatably adjustable in said track arms to place said hood in position to shield said inlet opening from falling rain in the rest position of the wiper.

3. A detergent holder as defined in claim 2, said cartridge track arms having an arcuate extent of approximately 180°.

4. A detergent holder as defined in claim 1 including a pair of outstanding arcuate axial flanges on the opposite ends of said housing defining arcuate grooves receiving said cartridge track arms in said rotatable engagement.

5. A detergent holder as defined in claim 4, said track arms having deformed lip portions along their edges of frictionally engage said grooves for retaining said housing on said track arms.

6. A detergent holder as defined in claim 1, said housing comprising a pair of molded plastic end parts permanemtly secured together intermediate the ends of the housing to retain said detergent stick in the housing.

7. A detergent holder as defined claim 6, each of said plastic end parts containing an opposite end of said rear side outlet opening, and a wick holder mounted over said opening.

8. A detergent holder as defined in claim 7, said wick holder having an elongated opening therein spanned by a longitudinal bar, and a wick comprising a flat piece of flexible wick material folded over said bar.

9. A detergent holder as defined in claim 1, said means for mounting said one end of said rod on said oscillating arm comprising a channel member receiving said arm and having inturned side flanges, a block on said one end of said rod disposed in said channel member, screw threaded holes in said block, and set screws extending through said plate and said holes in said block clamping said arm in said channel member.

* * * * *